(12) United States Patent
Ko

(10) Patent No.: US 6,189,182 B1
(45) Date of Patent: Feb. 20, 2001

(54) GUIDING BLOCK FOR PULLING A WINDOW CURTAIN

(76) Inventor: Kuen-Tin Ko, 19F-1, No. 211, Jong Jeng 4th Rd., Kaohsiung City (TW)

(*) Notice: Under 35 U.S.C. 154(b), the term of this patent shall be extended for 0 days.

(21) Appl. No.: 09/252,098

(22) Filed: Feb. 18, 1999

(51) Int. Cl.[7] .................................................. A47H 13/10
(52) U.S. Cl. ............................ 16/87.6 R; 16/91; 16/106; 16/107
(58) Field of Search .......................... 16/87.6 R, 87.2 R, 16/91, 102, 106, 107, 97, 98, 46; 160/330, 345, 368.1, 347; 384/531, 532

(56) References Cited

U.S. PATENT DOCUMENTS

| | | | |
|---|---|---|---|
| 3,076,222 | * | 2/1963 | Sloan ........................................ 16/106 |
| 3,293,685 | * | 12/1966 | Rosenbaum ........................ 16/87.6 R |
| 3,553,765 | * | 1/1971 | Frost ........................................ 16/107 |
| 4,049,308 | * | 9/1977 | Martin ...................................... 16/107 |
| 4,229,857 | * | 10/1980 | Toder ....................................... 16/95 R |
| 5,014,392 | * | 5/1991 | Melara ...................................... 16/46 |
| 5,749,661 | * | 5/1998 | Moller .................................... 384/526 |
| 5,924,800 | * | 7/1999 | Obara et al. ........................... 384/532 |

* cited by examiner

Primary Examiner—Chuck Y. Mah
(74) Attorney, Agent, or Firm—Rosenberg, Klein & Lee

(57) ABSTRACT

A guiding block for pulling a window curtain comprises a pulling plate, a left wheel seat, a plurality of rolling balls, and a right wheel seat. A confining cap is formed between the right wheel seat and the rolling balls. The primary body of the confining cap is a circular plate with a through hole on the center thereof. Claws with respective to the gaps between each two rolling balls are axially extended from the circular plate on the inner side of the confining cap. Not only the rolling action is smooth, but also the friction and collision between two rolling balls is prevented. Other then noises from frictions and collisions are reduced, the lifetime of the window curtain is prolonged. The circular groove of the convex tube on the right wheel seat is enforced into the rib on the inner rim of the convex tube on the left wheel seat so as to form a buckling state for combining the left wheel seat. Thus, sliding therebetween is seldom occurred and the stability of the combination thereof is increased. The left and right ribs and are circularly installed within the toggle of the pulling plate. After the left spacer and the right spacer enter into the hole of the pulling plate, they will be confined between the left and right ribs and difficult to release therefrom.

2 Claims, 3 Drawing Sheets

GUIDING BLOCK FOR PULLING A WINDOW CURTAIN

BACKGROUND OF THE INVENTION

In general, window curtains are used in buildings for shielding sunlight and protecting the private things. Moreover, the window curtains also have the effects of beautifying the environment.

In a general window curtain, curtain cloth slides along a sliding track for opening and closing the window curtains. The sliding operation is primarily induced from the rolling wheels on the top edge of the window curtain and the rolling wheels roll along a sliding track. Moreover, the movement of the rolling wheel is guided by a guide block.

Referring now to FIG. 6, the guide block (1) of prior art comprises the following components:

A pulling plate (11): A toggle (111) is on the upper portion of the pulling plate (11). A hanging plate (112) is on the lower rim of the toggle (111). A hanging hole (113) is on the distal end of the hanging plate (112) for being hooked by the hanging pin on the upper portion of the window curtain (3) A left rib (114) and a right resisting plate (115) are installed on the inner rims of the left and right end surfaces of the toggle (111) of the hanging plate (112).

A left wheel seat (12): a left spacer (121) with a through hole on the center thereof is the primary body. The left spacer (121) has an outer diameter slightly larger than the inner diameter of the left ribs (114) of the toggle (111). One side of the left spacer (121) is extended to form a convex tube (122). Another side of the left spacer (121) is extended to form a left rolling wheel (123). The left side of convex tube (122) on the left wheel seat (12) is inserted into the hole (116) of the toggle (111). The left spacer (121) is enforced into the left rim (114) by the elastic property thereof for combining the pulling plate (11).

A plurality of rolling balls (13): The rolling balls (13) are located above the left spacer (121) ofthe outer rim of the convex tube (122) on the left wheel seat (12).

A right wheel seat (14): the right spacer (141) with a through hole on the center thereof is the primary body of the right wheel seat (14). The outer diameter of the right spacer (141) is slightly larger than the inner diameter of the right resisting plate (115) of the toggle (111). One side of the right spacer (141) is extended to form as a convex tube (142). The outer diameter of the convex tube (142) is slight smaller than the inner diameter of the convex tube (122) of the left wheel seat (12). Another side of the right spacer (141) is extended as a right rolling wheel (143).

The convex tube (142) of the right wheel seat (14) is inserted into the hole (116) of the toggle (111) through the right side of the toggle (11). The right spacer (141) is enforced into the inside of the right rib (115) for combining a pulling plate (11). The convex tube (142) of the right wheel seat (14) is exactly inserted into the inner rim of the convex tube (122) of the left wheel seat (12) for combining the left wheel seat (12).

By the rolling of the rolling balls (13), the rotations of the left and right rolling wheels (123) and (143) becomes more smooth and the friction in rotation can be reduced.

However, the prior art design still has the following disadvantages:

1. The friction and collision between two rolling balls (3) occurs as the rolling ball is rolling. This will induce the wearing of the rolling balls.
2. The rotation of the rolling ball is retarded.
3. As the rolling balls (3) collide with one another, noises will generate.
4. Although the convex tube (142) of the right wheel seat (14) is enforced into the inner rim of the convex tube (122) of the left wheel seat (12) for combining the left wheel seat (12), However, this combination still depends upon the character of the materials, therefore, the stability thereof is insufficient.
5. A left rib (114) and a resisting plate (115) are extended from the inner rim of the left and right end surfaces of the pulling plate (11) so that after the left and right spacer (121) and (141) of the left and right wheel seat (12) and (14) enter into the ring hole (117) of the pulling plate (11), the gap therebetween is too large, thus, the left and right spacers (121) and (141) easily loosen.

SUMMARY OF THE INVENTION

Accordingly, the present invention has been made to overcome the above-mentioned problems.

The primary object of the present invention is to provide a guiding block for pulling a window curtain comprises a pulling plate, a left wheel seat, a plurality of rolling balls, and a right wheel seat. A confining cap is formed between the right wheel seat and the rolling balls. The primary body of the confining cap is a circular plate with a through hole on the center thereof. Claws with respective to the gaps between each two rolling balls are axially extended from the circular plate on the inner side of the confining cap. Not only the rolling action is smooth, but also the friction and collision between two rolling balls is prevented. Other then noises from frictions and collisions are reduced, the lifetime of the window curtain is prolonged. The circular groove of the convex tube on the right wheel seat is enforced into the rib on the inner rim of the convex tube on the left wheel seat so as to form a buckling state for combining the left wheel seat. Thus, sliding therebetween is seldom occurred and the stability of the combination thereof is increased. The left and right ribs and are circularly installed within the toggle of the pulling plate. After the left spacer and the right spacer enter into the hole of the pulling plate, they will be confined between the left and right ribs and difficult to release therefrom.

The various objects and advantages of the present invention will be more readily understood from the following detailed description when read in conjunction with the appended drawing.

DETAILED DESCRIPTION OF THE PREFERRED EMBODIMENTS

Figure 5:
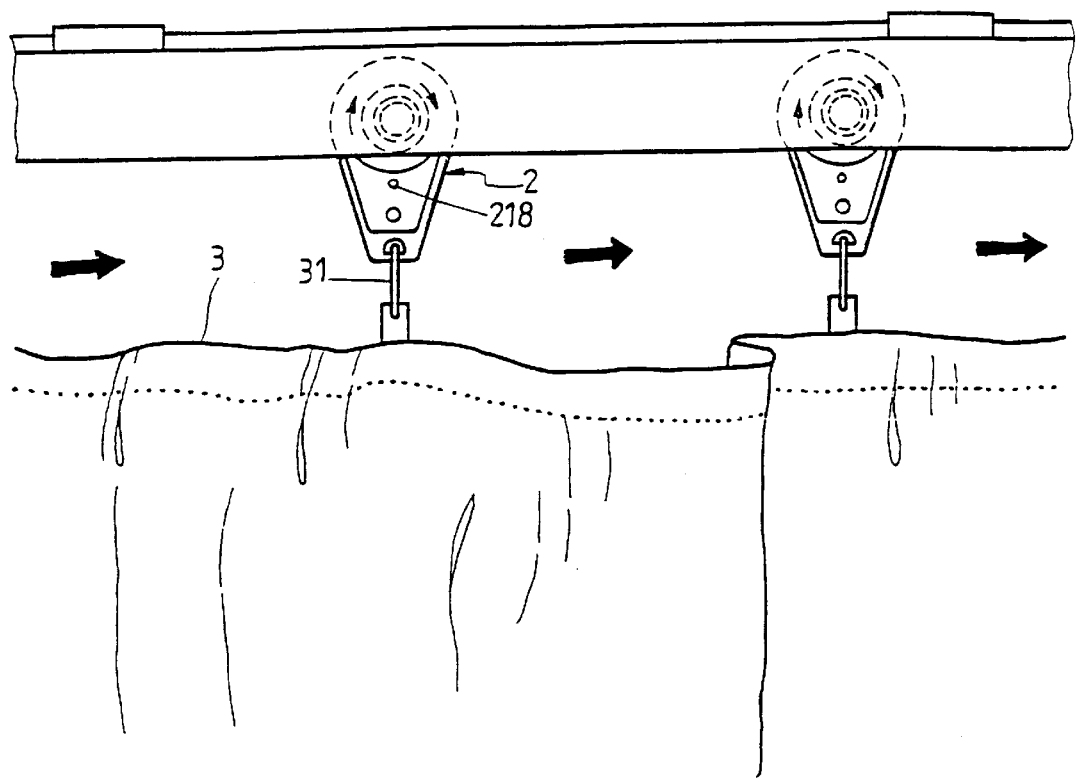
FIG. 5 is a state diagram showing the use of the present invention.
Figure 6:
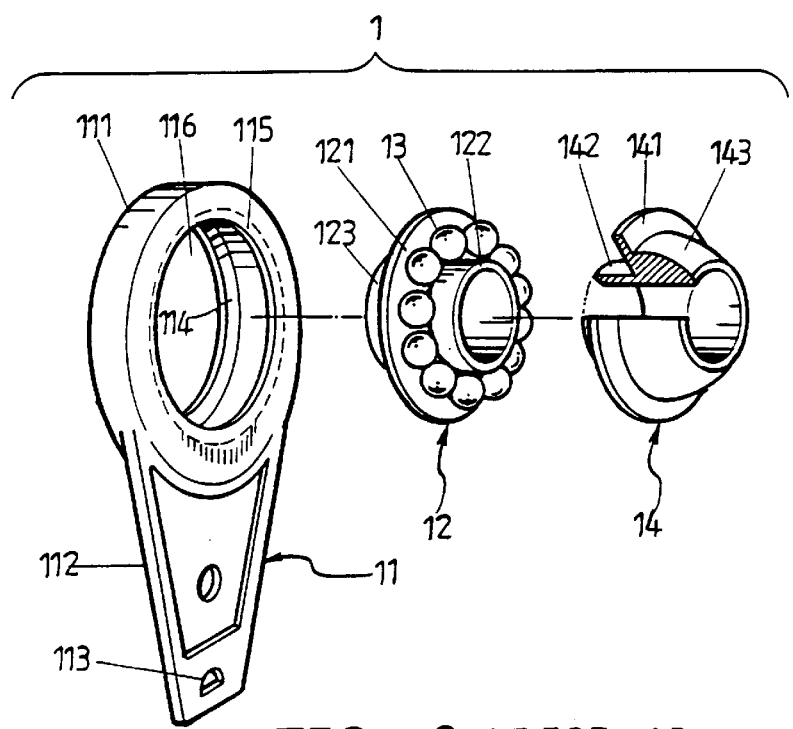
FIG. 6 is an exploded perspective view of a prior art device.

With reference now to FIG. 5, the present invention relates to a sliding block (2) for guiding the cloth of a window curtain along a sliding track so as to open and close a window curtain (3).

Figure 1:
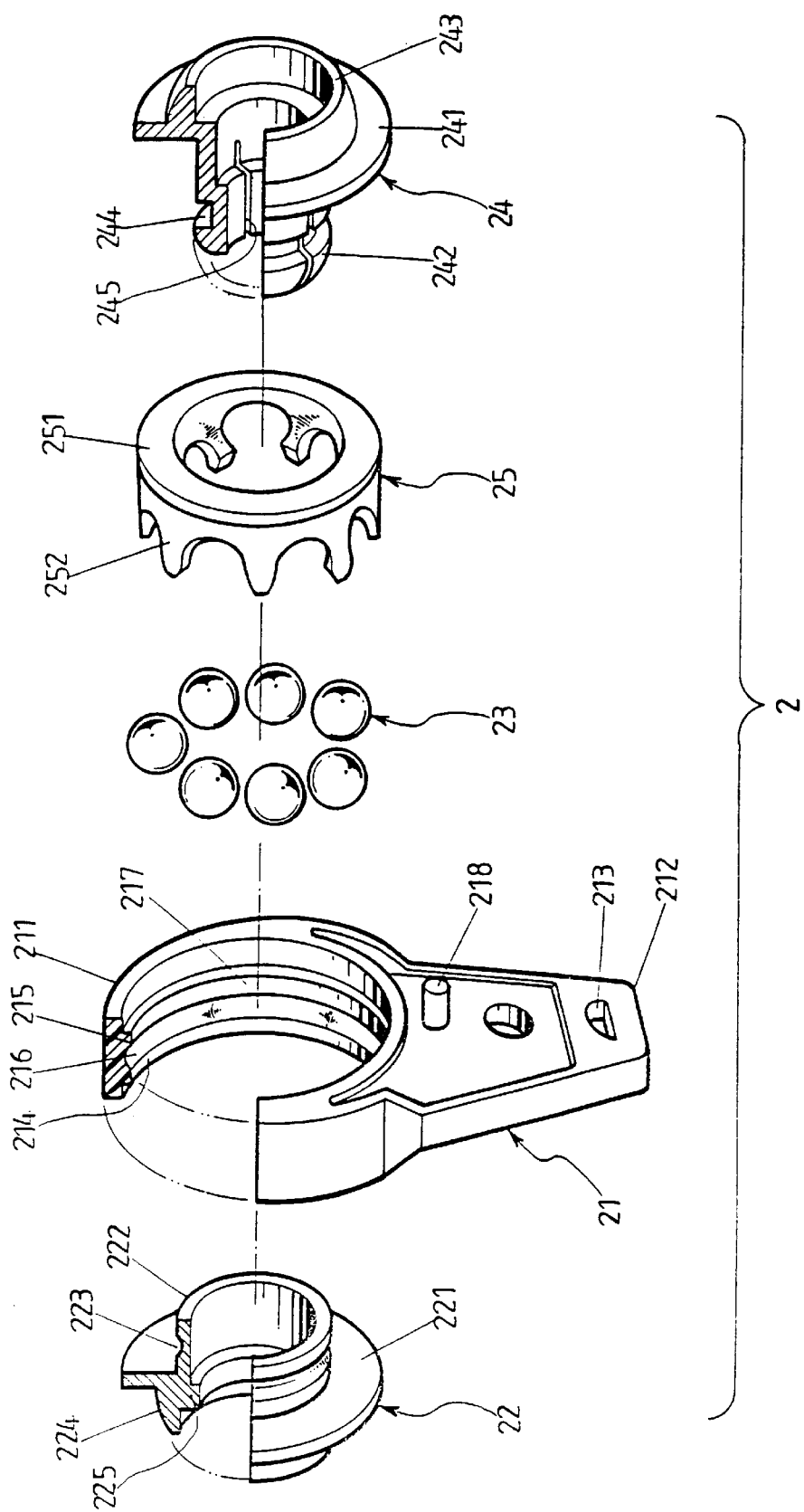
FIG. 1 is an exploded perspective view of the present invention.
Figure 2:
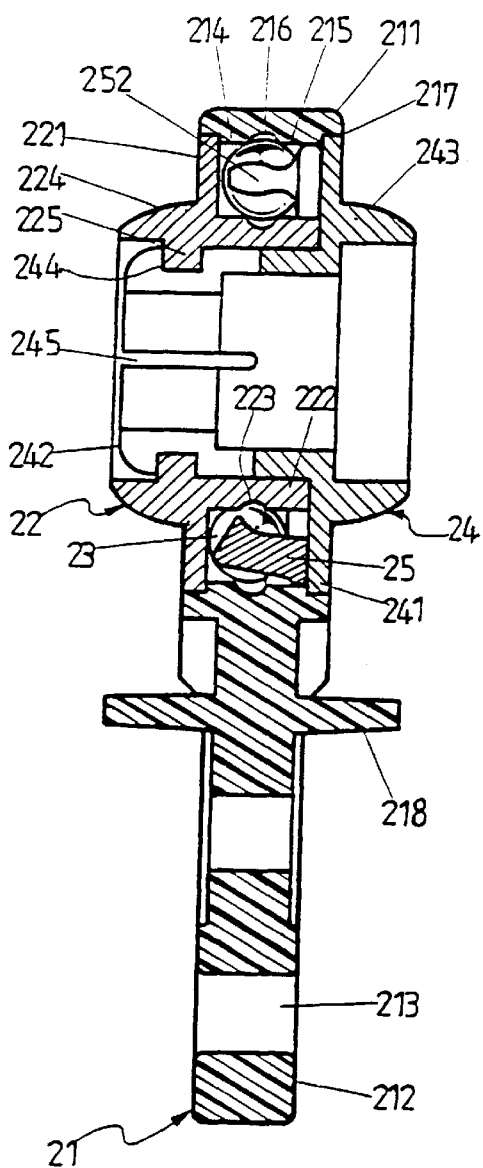
FIG. 2 is the assembled cross sectional view of the present invention.

Referring now to FIGS. 1 and 2, the present invention primarily includes the following components:

A pulling plate (21): A toggle (211) is on the upper portion of the pulling plate (21). A hanging plate (212) is on the lower rim of the toggle (211). A hanging hole (213) is on the distal end of the hanging plate (212) for being hooking by the hanging pin (31) on the upper portion of the window curtain (3) (as shown in FIG. 5). A left rib and a right rib (214) and (215) are installed on the inner rim of the toggle (211) of the hanging plate (212). A circular groove (216) is formed between the left and right ribs (214) and (215). A pillar (218) is formed on the two sides of the hanging plate (212) for confining the swing angle of the pulling plate (21) so as not to contact the sliding track.

A left wheel seat (22): a left spacer (221) with a through hole on the center thereof is the primary body itself. The left wheel seat (22) has an outer diameter slightly larger than the inner diameter of the left ribs (214) of the toggle (211). One side of the left spacer (221) is extended to form a convex tube (222). A circular groove (223) is installed outside the convex tube (222). Another side of the left spacer (221) is extended to form a left rolling wheel (224). The left side of convex tube (222) on the left wheel seat (22) is inserted into the hole (217) of the toggle (211). The left spacer (221) is enforced into the left rim (214) by the elastic property thereof for combining the pulling plate (21). The circular groove (223) of the left wheel seat (22) is corresponding to the circular groove (216) of the toggle (211). A rib (225) is installed inside the convex tube (222).

A plurality of rolling balls (23): The rolling balls (23) are located above the left spacer (221) of the outer rim of the convex tube (222) on the left wheel seat (22) and the rolling balls (23) is slightly received between the circular groove (223) of the left wheel seat (22) and the circular groove (216) on the inner rim of the toggle (211) body. Thus the rolling of the roller balls are sustained.

A right wheel seat (24): the right spacer (241) with a through hole on the center thereof is the primary body of the right wheel seat (24). The outer diameter of the right spacer (241) is slightly larger than the inner diameter of the right rib (215) of the toggle (211). One side of the right spacer (241) is extended to form as a convex tube (242). The convex tube (242) is installed with a circular groove (244) on the outside thereof. Another side of the right spacer (241) is extended as a right rolling wheel (243). The convex tube (242) of the right wheel seat (24) is inserted into the hole (217) of the toggle (211) through the right side of the toggle (211). The right spacer (241) is enforced into the inside of the right rib (215). A notch (245) is longitudinally installed with the convex tube (242) so that as the convex tube (242) is inserted into the convex tube (222) of the left wheel seat (22), a space for tightly clamping is formed for combining with the pulling plate (21). The circular groove (244) of the convex tube (242) on the right wheel seat (24) is enforced into the rib (225) on the inner rim of the convex tube (222) on the left wheel seat (22) so as to form a buckling state for combining the left wheel seat (22).

A confining cap (25): the confining cap (25) is installed between the right wheel seat (24) and the rolling balls (23). The primary body of the confining cap (25) is a circular plate (251) with a through hole on the center thereof. Claws (252) with respect to the gaps between each two rolling balls (23) are axially extended from the circular plate (251) on the inner side of the confining cap (25).

Figure 4:
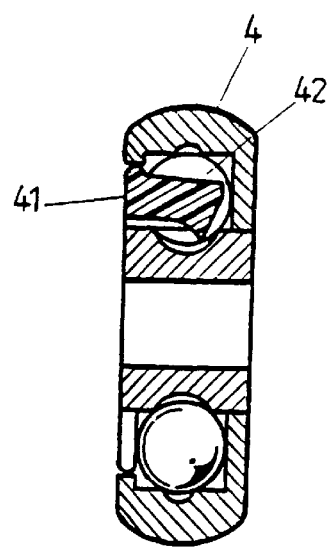
FIG. 4 is a cross sectional view showing another embodiment of the present invention.

With reference to FIG. 4, the single wheel type of the present invention is illustrated. Where one rolling wheel (4) serves to substitute the left and right rolling wheels to roll in the sliding track of the window curtain, while the confining cap (41) which is the character of the present invention is retained for confining the inner rolling balls within the pivotal rotated rolling wheel (4).

Figure 3:
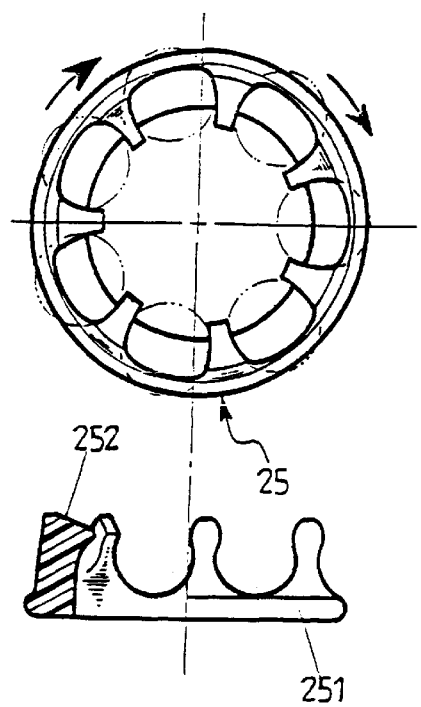
FIG. 3 is a schematic view showing the effect of the present invention.

Description of the Theory, Assembly and Operation of the Present Invention:

With reference to FIG. 3, the left and right rolling wheels (224) and (243) are slid in the sliding track by the rolling ball to roll around the left spacer (221). Since in the present invention, claws (252) with respect to the gaps between each two rolling balls (23) are axially extended from the circular plate (251) on the inner side of the confining cap (25), not only the rolling action is smooth, but also the friction and collision between two rolling balls (23) are prevented.

Advantages of the Present Invention:

1. Since in the present invention, claws (252) with respect to the gaps between each two rolling balls (23) are axially extended from the circular plate (251) on the inner side of the confining cap (25), not only the rolling action is smooth, but also the friction and collision between two rolling balls (23) is prevented. Other then noises from frictions and collisions are reduced, the lifetime of the window curtain is prolonged.
2. The circular groove (244) of the convex tube (242) on the right wheel seat (24) is enforced into the rib (225) on the inner rim of the convex tube (222) on the left wheel seat (22) so as to form a buckling state for combining the left wheel seat (22). Thus, sliding therebetween is prevented and the stability of the combination thereof is increased.
3. The left and right ribs (214) and (215) are circularly installed within the toggle (211) of the pulling plate (21). After the left spacer (221) and the right spacer (241) enter into the hole (217) of the pulling plate (21), they will be confined between the left and right ribs (214) and (215) and difficult to release therefrom.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

Description of Numerals in the Drawings

| | |
|---|---|
| guide block (1) | ring hole (217) |
| toggle (111) | pillar (218) |
| hanging plate (112) | left wheel seat (22) |
| hanging hole (113) | left spacer (221) |
| left rib (114) | convex tube (222) |
| right resisting plate (115) | circular groove (223) |
| ring hole (116) | right wheel (224) |
| left wheel seat (12) | rib (225) |
| left spacer (121) | rolling balls (23) |
| convex tube (122) | right wheel seat (24) |
| left rolling wheel (123) | right spacer (241) |
| rolling balls (13) | convex tube (242) |
| right wheel seat (14) | right rolling wheel seat (243) |
| right spacer (141) | circular groove (244) |
| convex tube (142) | notch (245) |
| right rolling wheel (143) | confining cap (25) |
| guide block (2) | ring plate (251) |

| | |
|---|---|
| toggle (211) | window curtain (3) |
| hanging plate (212) | hanging (31) |
| hang hole (213) | rolling wheel (4) |
| left rib (214) | rolling ball (42) |
| right resisting plate (215) | rolling ball (43) |
| circular groove (216) | |

What is claimed is:

1. A guiding block apparatus for displaceably suspending a curtain assembly from a support structure comprising:
   (a) a pulling plate including:
      (1) a toggle portion having an inner rim defining an axially extending hole, said toggle portion having left and right annular ribs extending radially into said hole from said inner rim to define therebetween an annular groove; and
      (2) a hanging plate portion extending downward from said toggle portion, said hanging plate having at least one pillar projecting therefrom;
   (b) a left wheel seat coaxially coupled to said pulling plate toggle portion, said left wheel seat defining a bore extending axially therethrough, said left wheel seat including distal left rolling wheel and convex tube portions projecting axially from an annular left spacer portion, said left rolling wheel portion having formed thereon an annular rib extending radially into said bore, said convex tube portion having formed thereabout an annular groove disposed substantially in radially opposed alignment with said annular groove of said pulling plate toggle portion upon said left spacer portion engaging said left rib of said pulling plate toggle portion, said left spacer portion being configured to engage said left rib in radially overlapping manner;
   (c) a plurality of rolling balls retained in revolvable manner between said annular grooves of said pulling plate toggle portion and said left wheel seat convex tube portion;
   (d) a right wheel seat coaxially coupled to said pulling plate toggle portion, said right wheel seat defining an axial opening extending therethrough, said right wheel seat including distal right rolling wheel and convex tube portions projecting axially from an annular right spacer portion, said convex tube portion extending into said bore of said left wheel seat, said convex tube portion having a plurality of notches formed longitudinally therein and an annular slot formed longitudinally thereabout, said annular slot lockingly engaging said annular rib of said left rolling wheel portion of said left wheel seat upon said right spacer portion engaging said right rib of said pulling plate toggle portion, said right spacer portion being configured to engage said right rib in radially overlapping manner; and,
   (e) a confining cap disposed between said right wheel seat and said rolling balls, said confining cap including an annular plate portion and a plurality of claws extending axially therefrom, said claws each extending between adjacent one of said rolling balls for spacing said adjacent rolling balls one from the other.

2. A guiding block apparatus for displaceably suspending a curtain assembly from a support structure comprising:
   (a) a toggle body having an annular groove formed therein;
   (b) a rolling wheel rotatably coupled in concentric manner to said toggle body, said rolling wheel including an annular rim portion having formed therein an annular groove aligned disposed substantially in radially opposed alignment with said annular groove of said toggle body;
   (c) a plurality of rolling balls retained in revolvable manner between said annular grooves of said rolling wheel and said toggle body; and,
   (d) a confining cap coaxially coupled to said rolling wheel, said confining cap including an annular plate portion and a plurality of claws extending axially therefrom, said claws each extending between adjacent one of said rolling balls for spacing said adjacent rolling balls one from the other.

* * * * *